United States Patent [19]

Abeler et al.

[11] Patent Number: 4,954,546
[45] Date of Patent: Sep. 4, 1990

[54] PVC RESIN BLEND COMPOSITIONS STABILIZED WITH LAURYLTIN COMPOUNDS

[75] Inventors: Gerd Abeler, Darmstadt; Hans J. Sander, Lorsch, both of Fed. Rep. of Germany

[73] Assignee: Ciba-Geigy Corporation, Ardsley, N.Y.

[21] Appl. No.: 317,039

[22] Filed: Feb. 28, 1989

Related U.S. Application Data

[63] Continuation of Ser. No. 219,900, Jul. 18, 1988, abandoned, which is a continuation of Ser. No. 54,718, May 27, 1987, abandoned.

[30] Foreign Application Priority Data

May 30, 1986 [CH] Switzerland ............... 2207/86

[51] Int. Cl.$^5$ ............................................. C08K 5/58
[52] U.S. Cl. ..................................... 524/180; 525/222; 525/235; 525/230; 525/238
[58] Field of Search ...................... 524/180, 181, 182; 525/222, 230, 235, 238

[56] References Cited

U.S. PATENT DOCUMENTS

| | | | |
|---|---|---|---|
| 2,789,102 | 4/1957 | Weinberg | 524/180 |
| 3,125,545 | 3/1964 | Van Cleve et al. | 525/222 |
| 3,367,997 | 2/1968 | Smith | 524/180 |
| 3,479,315 | 11/1969 | Weisfeld | 524/180 |
| 3,517,083 | 6/1970 | Salyer | 525/222 |
| 3,534,121 | 10/1970 | Eggensperger et al. | 524/180 |
| 3,565,930 | 2/1971 | Kauder et al. | 524/180 |
| 3,640,950 | 2/1972 | Weisfeld | 524/180 |
| 3,697,566 | 10/1972 | Sassa et al. | 524/180 |
| 3,759,863 | 9/1973 | Czekay et al. | 524/180 |
| 3,817,915 | 6/1974 | Kauder et al. | 524/180 |
| 3,969,469 | 7/1976 | Love | 525/230 |
| 4,134,878 | 1/1979 | Burley et al. | 524/180 |
| 4,181,671 | 1/1980 | Burley et al. | 524/180 |
| 4,183,846 | 1/1980 | Larkin et al. | 524/180 |
| 4,193,913 | 3/1980 | Abeler | 524/180 |

FOREIGN PATENT DOCUMENTS

| | | |
|---|---|---|
| 3227107 | 1/1984 | Fed. Rep. of Germany . |
| 3401482 | 7/1985 | Fed. Rep. of Germany . |
| 3445856 | 6/1986 | Fed. Rep. of Germany . |
| 2075312 | 10/1971 | France . |
| 48-23337 | 7/1973 | Japan . |
| 1257018 | 12/1971 | United Kingdom . |
| 1268580 | 3/1972 | United Kingdom . |
| 1346999 | 2/1974 | United Kingdom . |
| 2102433 | 2/1983 | United Kingdom . |
| 2139625A | 11/1984 | United Kingdom . |
| 2139625B | 5/1987 | United Kingdom . |
| 2139625 | 5/1987 | United Kingdom . |

OTHER PUBLICATIONS

Luigten, J. G. et al., British Plastics, 183-186, May 1957.
Foster, P. et al., Kunstoffe 69 (1979), translation in German Plastics 8 to 13 (1979).
Ranby, B. G., J. Polymer Sci.: Symposium No. 51, 89-104 (1975).
Richard G. Parker et al., "The Ligand Exchange Reaction of Some Dialkyltin Dimercaptides and Dicarboxylates with Dialkyltin Dichlorides", *Stabilization and Degradation of Polymers*, D. Allara et al., editors, Amer. Chem. Society, pp. 363-373 (1978).
CA: 105, 11604v (1968).
H. V. Smith, "New Lauryltin Compounds", Jun. 23, 1976, 6 pages.
CA 100, 193236w (1984).
CA 105, 116014y (1986).

*Primary Examiner*—Veronica P. Hoke
*Attorney, Agent, or Firm*—Harry Falber; JoAnn Villamizar

[57] ABSTRACT

The invention relates to compositions comprising 20–80% of a vinyl chloride homopolymer (PVC) and 80–20% of at least one copolymer selected from the group consisting of polystyrene/polyethylene/butylene, acrylate/rubber, acrylate/rubber/styrene, acrylonitrile/styrene/acrylate, ABS, NBR, NAR, SAN, EVA and modified EVA, which compositions are stabilized with at least one tin compound of formula $$(n\text{-}C_{12}H_{25})_2 Sn[S(CH_2)_n COOR]_2 \quad \text{(I)}$$

or $$(n\text{-}C_{12}H_{25}) Sn[S(CH_2)_n COOR^1]_3 \quad \text{(II)}$$

or with a mixture of compounds of formulae I and II, wherein n is 1 or 2 and R and $R^1$ are each independently of the other $C_6$–$C_{18}$ alkyl. These compositions have improved heat storage properties and are particularly suitable for fabricating sheets and hollow bodies for use in the automotive industry.

12 Claims, No Drawings

PVC RESIN BLEND COMPOSITIONS STABILIZED WITH LAURYLTIN COMPOUNDS

This application is a continuation of application Ser. No. 219,900 filed July 18, 1988, now abandoned which application is a continuation of application Ser. No. 054,718 filed May 27, 1987, now abandoned.

The present invention relates to compositions comprising a vinyl halide copolymer and at least one copolymer, which compositions contain at least one lauryltin compound as stabiliser.

A variety of articles made from PVC blends, i.e. mixtures of PVC and a copolymer, have a propensity to release volatile substances into the ambient atmosphere when exposed to the prolonged action of heat, e.g. to intense solar radiation. This effect can have undesirable consequences for the use properties of these articles and is especially undesirable in the case of the interior fittings of motor vehicles made from such articles, as e.g. unpleasant odours and fogging may occur. One cause of the formation of the volatile constituents is the presence of monomeric plasticisers. Other additives in the polymer, however, also contribute to the aforementioned undesirable characteristic. When using organotin stabilisers a substantial reduction in the tin content of the articles in question is frequently observed. There is consequently a need to provide stabilisers that do not have the shortcomings referred to above or which at least exhibit them to a far lesser degree.

Surprisingly, it has been found that by using lauryltin mercapto carboxylates as stabilisers it is possible to eliminate, or at least to lessen, the aforementioned problems in connection with articles made form PVC blends. In addition, these stabilisers also have excellent heat stabilising properties, although their tin content is lower than that of otherwise conventional organotin stabilisers, for example those of the butyltin series. A further essential advantage of lauryltin compounds resides in their exceedingly low toxicity.

Lauryltin compounds are known from the literature, as is also their use as stabilisers for PVC. The following publications may be cited here by way of reference: DE-B 1 669 899, DE-A 1 959 909, DE-A 3 416 257, EP-A 70 497. However, the compositions described below based on PVC/copolymer mixtures and stabilised with lauryltin mercapto carboxylates have so far not been specifically described. In addition, it is not known that the problem of tin impoverishment in these mixtures can be solved with the aid of the cited stabilisers.

Accordingly, the present invention relates to compositions comprising 20–80% of a vinyl chloride homopolymer (PVC) and 80–20% of at least one copolymer selected from the group consisting of polystyrene/-polyethylene/butylene, acrylate/rubber, acrylate/rubber/styrene, acrylonitrile/styrene/acrylate, ABS, NBR, NAR, SAN, EVA and modified EVA, which compositions are stabilised with at least one tin compound of formula

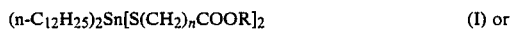

(I) or

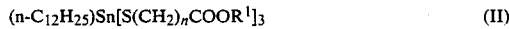

(II)

or with a mixture of compounds of formulae I and II, wherein n is 1 or 2 and R and $R^1$ are each independently of the other $C_6$–$C_{18}$alkyl.

The vinyl chloride polymer preferably contains ABS, NBR, NAR, SAN, EVA and/or modified EVA as copolymer component.

The conventional abbreviations of the copolymers employed throughout this specification and in the appended claims have the following meanings:
ABS: acrylonitrile/butadiene/styrene
SAN: styrene/acrylonitrile
NBR: acrylonitrile/butadiene
NAR: acrylonitrile/acrylate
EVA: ethylene/vinyl acetate.

Preferred polymer compositions are those comprising 25–75% of PVC and 75–25% of the cited copolymers. Examples of such compositions are: 25–50% of PVC and 75–50% of copolymer or 40–75% of PVC and 60–25% of copolymer. Preferred copolymers are ABS, SAN and modified EVA, with ABS being most preferred. Particularly suitable copolymers are also NBR, NAR and EVA. The compositions of this invention may contain one or more of the cited copolymers.

The lauryltin stabilisers of formula I or II or mixture thereof can be added in amounts ob 0.1 to 10%, preferably 0.5 to 5%, e.g. 1–3%, based on the total compositions.

If a mixture of I and II is employed, its compositions may vary within wide limits, e.g. 90–10% of I and 10–90% of II, preferably 30–70%, e.g. 40–60%, of I and 70–30%, e.g. 60–40% of II, or 50–70% of I and 50–30% of II.

In preferred compounds of formulae I and II n is 1, i.e. the compounds are thioglycolates. R and $R^1$ are preferably $C_8$–$C_{18}$alkyl, most preferably $C_8$–$C_{14}$alkyl, e.g. $C_8$–$C_{12}$alkyl. Most preferably R and $R^1$ are the 2-ethylhexyl (=isooctyl) radical.

The compositions of this invention need not contain plasticisers, but they may contain conventional monomeric and/or polymeric plasticisers, e.g. in an amount of up to 50%, i.e. from about 0.1 to 50%, preferably from 1 to 50%, e.g. from 10 to 40%.

The compositions of the present invention are prepared by known methods. The stabilisers are added to the polymer blends before processing in known manner. A homogeneous mixture can be obtained e.g. using a two-roll mixer in the temperature range from 150° to 210°.

The lauryltin stabilisers may also conveniently be used in conventional amounts in conjunction with at least one conventional PVC stabiliser and/or further additives such as epoxy compounds, phosphites, metal carboxylates and metal phenolates of metals of main and auxiliary group II of the Periodic Table, or also inorganic salts of metals of auxiliary group II of the Periodic Table, as well as antioxidants.

Costabilisers are preferably added in amounts of 0.05 to 6%, most preferably 0.1 to 4%, based on the total composition.

Suitable conventional phosphites are those of the general formula

(III)

wherein $R^3$, $R^4$ and $R^5$ are identical or different and are $C_6$–$C_{18}$alkyl, $C_6$–$C_{18}$alkenyl, a substituted or unsubstituted phenyl radical or $C_5$–$C_7$cycloalkyl.

R³, R⁴ and R⁵ as C₆–C₁₈alkyl may be n-hexyl, n-octyl, n-nonyl, decyl, dodecyl, tetradecyl, hexadecyl or octadecyl. Alkyl groups of 8 to 18 carbon atoms are preferred.

R³, R⁴ and R⁵ as substituted phenyl may be tolyl, ethylphenyl, xylyl, cumyl, cymyl, cresyl, 4-methoxyphenyl, 2,4-dimethoxyphenyl, alkoxyphenyl, butoxyphenyl, p-n-octylphenyl, p-n-nonylphenyl or p-n-dodecylphenyl.

Particularly suitable phosphites are trioctylphosphite, tridecylphosphite, tridodecylphosphite, tritetradecylphosphite, tristearylphosphite, trioleylphosphite, triphenylphosphite, tricresylphosphite, tris-p-nonylphosphite or tricyclohexylphosphite. Most preferred are the arylalkylphosphites as well as the alkyldiarylphosphites, e.g. phenyldidecylphosphite, nonylphenyldidecylphosphite, (2,4-di-tert-butylphenyl)didodecylphosphite, (2,6-di-tert-butylphenyl) didodecylphosphite.

Examples of metal carboxylates are the metal salts of saturated, unsaturated or hydroxylated aliphatic carboxylic acids of 6 to 20 carbon atoms, e.g. hexanoic acid, heptanoic acid, octanoic acid, 2-ethylhexanoic acid, undecanoic acid, lauric acid, myristic acid palmitic acid, stearic acid, 12-oxystearic acid, oleic acid, linoleic acid or ricinolic acid. Also suitable are the metal salts of aromatic carboxylic acids, e.g. substituted phenylbenzoates. Preferred metals are those of the series consisting of Ba, Sr, Ca, Mg, Zn and Cd. Examples of preferred metal carboxylates are calcium or zinc stearate and zinc or calcium oleate.

Particularly suitable metal phenolates are the metal salts of phenols of 6 to 20 carbon atoms, e.g. alkylphenols such as p-tert-butylphenol, p-octylphenol, n-nonylphenol or p-dodecylphenol. Barium p-tert-butylbenzoate or barium p-n-nonylphenolate may be cited as examples.

Examples of antioxidants are

1.1. Alkylated monophenols, e.g.

2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-isobutylphenol
2,6-dicyclopentyl-4-methylphenol
2-(α-methylcyclohexyl)-4,6-dimethylphenol
2,6-dioctadecyl-4-methylphenol
2,4,6-tricyclohexylphenol
2,6-di-tert-butyl-4-methoxymethylphenol

1.2. Alkylated hydroquinones, e.g.

2,6-di-tert-butyl-4-methoxyphenol
2,5-di-tert-butylhydroquinone
2,5-di-tert-amylhydroquinone
2,6-diphenyl-4-octadecyloxyphenol

1.3. Hydroxylated thiodiphenyl ethers, e.g.

2,2'-thiobis(6-tert-butyl-4-methylphenol)
2,2'-thiobis(4-octylphenol)
4,4'-thiobis(6-tert-butyl-3-methylphenol)
4,4'-thiobis(6-tert-butyl-2-methylphenol)

1.4. Alkylidenebisphenols, e.g.

2,2'-methylenebis(6-tert-butyl-4-methylphenol)
2,2'-methylenebis(6-tert-butyl-4-ethylphenol)
2,2'-methylenebis[4-methyl-6-(α-methylcyclohexyl)-phenol]
2,2'-methylenebis(4-methyl-6-cyclohexylphenol)
2,2'-methylenebis(6-nonyl-4-methylphenol)
2,2'-methylenebis(4,6-di-tert-butylphenol)
2,2'-ethylidenebis(4,6-di-tert-butylphenol)
2,2'-ethylidenebis(6-tert-butyl-4-isobutylphenol)
2,2'-methylenebis[6-(α-methylbenzyl)-4-nonylphenol]
2,2'-methylenebis[6-(α,α-dimethylbenzyl)-4-nonylphenol]
4,4'-methylenebis(2,6-di-tert-butylphenol)
4,4'-methylenebis(6-tert-butyl-2-methylphenol)
1,1-bis(5-tert-butyl-4-hydroxy-2-methylphenyl)butane
2,6-bis(3-tert-butyl-5-methyl-2-hydroxybenzyl)-4-methylphenol
1,1,3-tris(5-tert-butyl-4-hydroxy-2-methylphenyl)butane
1,1-bis(5-tert-butyl-4-hydroxy-2-methylphenyl)-3-n-dodecylmercaptobutane
ethylene glycol bis[3,3-bis(3'-tert-butyl-4'-hydroxyphenyl)butyrate]
bis(3-tert-butyl-4-hydroxy-5-methylphenyl)dicyclopentadiene
bis[2-(3'-tert-butyl-2'-hydroxy-5'-methylbenzyl)-6-tert-butyl-4-methylphenyl] terephthalate

1.5. Benzyl compounds, e.g.

1,3,5-tris-(3,5-di-tert-butyl-4-hydroxybenzyl)-2,4,6-trimethylbenzene
bis(3,5-di-tert-butyl-4-hydroxybenzyl) sulfide
isooctyl 3,5-di-tert-butyl-4-hydroxybenzylmercaptoacetate
bis(4-tert-butyl-3-hydroxy-2,6-dimethylbenzyl) dithiolterephthalate
1,3,5-tris(3,5-di-tert-butyl-4-hydroxybenzyl) isocyanurate
1,3,5-tris(4-tert-butyl-3-hydroxy-2,6-dimethylbenzyl) isocyanurate dioctadecyl 3,5-di-tert-butyl-4-hydroxybenzylphosphonate
calcium salt of monoethyl 3,5-di-tert-butyl-4-hydroxybenzylphosphonate

1.6. Acylaminophenols, e.g.

anilide of 4-hydroxylauric acid
anilide of 4-hydroxystearic acid
2,4-bis(octylmercapto)-6-(3,5-di-tert-butyl-4-hydroxyanilino)-s-triazine
octyl N-(3,5-di-tert-butyl-4-hydroxyphenyl)carbamate

1.7. Esters of β-(-b 3,5-di-tert-butyl-4-hydroxyphenyl)propionic acid with mono- or polyhydric alcohols, e.g. with

| methanol | diethylene glycol |
| octadecanol | triethylene glycol |
| 1,6-hexanediol | pentaerythritol |
| neopentyl glycol | tris(hydroxyethyl) isocyanurate |
| thiodiethylene glycol | bis(hydroxyethyl)oxyl diamide |

1.8. Esters of β-(5-tert-butyl-4-hydroxy-3-methylphenyl)propionic acid with mono- or polyhydric alcohols, e.g. with

| methanol | diethylene glycol |
| octadecanol | triethylene glycol |
| 1,6-hexanediol | pentaerythritol |

| -continued | |
|---|---|
| neopentyl glycol | tris(hydroxyethyl) isocyanurate |
| thiodiethylene glycol | bis(hydroxyethyl)oxyl diamide |

1.9. Amides of
β-(3,5-di-tert-butyl-4-hydroxyphenyl)propionic acid,
e.g.

N,N'-bis(3,5-di-tert-butyl-4-hydroxyphenylpropionyl)-
hexamethylenediamine
N,N'-bis(3,5-di-tert-butyl-4-hydroxyphenylpropionyl)-
trimethylenediamine
N,N'-bis(3,5-di-tert-butyl-4-hydroxyphenylpropionyl)-
hydrazine.

Preferred antioxidants are alkylated monophenols, alkylidene bisphenols and phenyl-substituted propionates, but most preferred are, 2,6-di-tert-butyl-p-cresol, 2,2-bis(4'-hydroxyphenyl)propane and n-octadecyl β-(3,5-di-tert-butyl-4-hydroxyphenyl)propionate.

Depending on the utility of the polymers, further adjuvants may also be added before or during incorporation of the stabilisers, for example lubricants (preferably montan waxes or glycerol esters), fatty acid esters, paraffins, plasticisers, fillers, carbon black, asbestos, kaolin, talcum, glass fibres, modifiers (e.g. impact strength additives), fluorescent whitening agents, pigments, light stabilisers, UV absorbers, flame retardants or antistats.

Preferred additives of the above king are lubricants, pigments, processing aids, fillers, antioxidants and/or light stabilisers.

The compositions of the invention can be processed to moulded articles by conventional shaping methods, e.g. by extrusion, injection mounding or calendering. Their use as plastisols is also possible.

It is preferred to use the compositions of this invention for making hollow bodies and, in particular, sheets in the automotive industry. This utility also constitutes an object of the invention. A particularly preferred field of use is the manufacture of sheets for motor vehicle interiors, especially as described in DE-A 3 227 107 and DE-A 3 401 482.

The compositions of the invention are used with particular advantage for the manufacture of deep-drawn sheets and flexible sheets based on PVC, especially for use in the automotive industry.

As is known from the chemistry of organotin stabilisers, these stabilisers are often no longer present in the stabilised substrate in the form in which they were added. Reaction products (co-condensation and splitting products) are formed. It will be readily understood that compositions that contain such products formed from the compounds of formula I or II or mixtures thereof also fall within the scope of the present invention.

The lauryltin stabilisers of formulae I and II are known (q.v. the references cited at the outset).

Conjointly with the compounds of formula I or II or mixture thereof further tin stabilisers may also be present in the compositions of this invention, provided they do not adversely affect the improved properties obtained with the above mentioned compounds. Preferably, however, the compounds of formula I or II or mixture thereof are the only tin stabilisers added to the compositions of the invention.

The invention further relates to the use of the compounds of formula I or II or mixture thereof for stabilising compositions comprising 20–80% of a vinyl chloride homopolymer (PVC) and 80–20% of at least one copolymer selected from the group consisting of polystyrene/polyethylene/butylene, acrylate/rubber, acrylate/rubber/styrene, acrylonitrile/styrene/acrylate, ABS, NBR, NAR, SAN, EVA and modified EVA, preferably from the group consisting of ABS, NBR, NAR, SAN, EVA and modified EVA, against the influence of light and heat.

The following Examples illustrate the invention in more detail. Parts and percentages are by weight, as also in the foregoing description and in the appended claims, unless otherwise stated.

EXAMPLE 1

Long-term exposure of sheets to heat and determination of the decrease in tin content.

A mixture of the following compositions:
50 parts of S-PVC (K-value 70)
30 parts of ABS
30 parts of ABS modified with SAN
10 parts of modified EVA
15 parts of trimellitic acid ester (plasticiser)
3 parts of rutile
2.5 parts of stabiliser A
is rolled in conventional manner for 5 minutes at 190° C. to a 0.4 mm sheet. Pieces of this sheet measuring 4×4 cm are hung up in a drying cabinet at 120° C. such that both sides of each sheet are free. The pieces of sheet are removed after 480 hours and the tin content is determined by the X-ray fluorescence method. The results are reported in Table 1.

TABLE 1

| Test | Stabiliser | Tin content initial value | Tin content final value | Decrease (%) |
|---|---|---|---|---|
| 1 | A | 0.23% | 0.23% | 0 |

No loss of tin has thus occured.

EXAMPLE 2

Weight loss of stabiliser on exposure to heat 5 g of (n-C$_{12}$H$_{25}$)$_2$Sn(SCH$_2$COO-iso-C$_8$-C$_{17}$)$_2$ are heated in a Petri dish in a recirculating air drier for 45 minutes to 160° C. The weight loss of the sample is determined after cooling in an exsiccator. The discolouration of the sample is also determined (colour number according to Gardner).

The weight loss was 3%. The colour number was 1 before and after treatment.

EXAMPLE 3

Determination of heat stability by means of the discolouration in the dynamic heat test (continuous roll test).

A mixture having the composition as indicated in Example 1 (stabiliser A) is rolled to a 0.3 mm sheet at a temperature of 190° C. The discolouration is determined in accordance with the method of ASTM D 1925-70 at 5 minute intervals. The values obtained (Yellowness Index YI) are reported in Table 2.

TABLE 2

| Stabiliser A | Yellowness (YI) after |  |  |  |  |  |  |  |  |  |  |
|---|---|---|---|---|---|---|---|---|---|---|---|
|  | 5 | 10 | 15 | 20 | 25 | 30 | 35 | 40 | 45 | 50 | 55 | 60 minutes |
|  | 17 | 22 | 26 | 30 | 33 | 37 | 40 | 42 | 47 | 50 | 53 | 55 |

EXAMPLES 4–6

Three further compositions of the invention are indicated in Table 3. They can be processed to sheets as described in Example 1 or 3.

TABLE 3:

| Example | 4 | 5 | 6 |
|---|---|---|---|
| S-PVC (K-value 70) | 50 | 40 | 70 |
| ABS | 40 | 30 | — |
| NBR | 10 | — | — |
| SAN | — | 10 | — |
| modified EVA | — | 20 | 30 |
| polymethylmethacrylate PMMA (flow aid) | 2 | 2 | 2 |
| trimellitic acid ester (plasticiser) | — | 30 | — |
| diisodecylphthalate (plasticiser) | 15 | — | — |
| lubricant | 0.3 | 0.3 | 0.3 |
| antimony trioxide | 5 | 5 | — |
| chalk | 2 | — | — |
| titanium dioxide | 5 | — | — |
| carbon black | — | 0.2 | — |
| pentaerythrityl-tetrakis-[3-(3,5-di-tert-butyl-4-hydroxyphenyl)propionate] (antioxidant) | 0.2 | 0.2 | 0.2 |
| 2-(2-hydroxy-3,5-di-tert-butyl)-benztriazole | — | — | 0.5 |
| epoxidised soybean oil | — | 2 | — |
| stabiliser B | 2 | — | 1 |
| stabiliser C | — | 2 | 1.5 | stabiliser B: n-$C_{12}H_{25}$Sn(SCH$_2$COO-iso-$C_8H_{17}$)$_3$
stabiliser C: (n-$C_{12}H_{25}$)$_2$Sn(SCH$_2$COO-iso-$C_8H_{17}$)$_2$

EXAMPLE 7

Comparably advantageous effects are obtained by using a composition comprising a mixture of
49% by weight of ($C_{12}H_{25}$)$_2$Sn(SCH$_2$COO-iso-$C_8H_{17}$)$_2$
and
51% by weight of ($C_{12}H_{25}$)Sn(SCH$_2$COO-iso-$C_8H_{17}$)$_3$
instead of the lauryltin compounds or mixtures thereof employed in Examples 4–6.

What is claimed is:

1. In a polymer blend of 20 to 80% by weight of poly(vinylchloride) and 80 to 20% by weight of at least one copolymer selected from the group consisting of polystyrene/polyethylene/butylene, acrylate/rubber, acrylate/rubber/styrene, acrylonitrile/styrene/acrylate, acrylonitrile/butadiene/styrene, acrylonitrile/butadiene, acrylonitrile/acrylate, styrene/acrylonitrile, ethylene/vinyl acetate, and modified ethylene/vinyl acetate, which blend contains a dialkyl-tin mercaptide stabilizer, the improvement reducing loss of the stabilizer from the blend upon prolonged exposure to light and heat which comprises employing as the dialkyl-tin mercaptide an effective stabilizing amount of at least one compound of the formula:

$$(n\text{-}C_{12}H_{25})_2Sn[S(CH_2)_nCOOR]_2 \text{ or}$$

$$(n\text{-}C_{12}H_{25})Sn[S(CH_2)_nCOOR^1]_3$$

wherein n is 1 or 2, and each of R and $R^1$, independently of the other, is alkyl of 6 to 18 carbon atoms.

2. The polymer blend according to claim 1 wherein the copolymer is selected from the group consisting of acrylonitrile/butadiene/styrene, acrylonitrile/butadiene, acrylonitrile/acrylate, styrene/acrylonitrile, ethylene/vinyl acetate and modified ethylene/vinyl acetate.

3. The polymer blend according to claim 1 wherein the amount of stabilizer is from 0.5 to 5% by weight.

4. The polymer blend according to claim 1 wherein n has a value of 1.

5. The polymer blend according to claim 1 wherein R and $R^1$ contain from 8 to 14 carbon atoms.

6. The polymer blend according to claim 1 wherein R and $R^1$ are 1-ethylhexyl.

7. In the process of stabilizing a polymer blend of 20 to 80% by weight of poly(vinylchloride) and 80 to 20% by weight of at least one copolymer selected from the group consisting of polystyrene/polyethylene/butylene, acrylate/rubber, acrylate/rubber/styrene, acrylonitrile/styrene/acrylate, acrylonitrile/butadiene/styrene, acrylonitrile/butadiene, acrylonitrile/acrylate, styrene/acrylonitrile, ethylene/vinyl acetate with a dialkyl-tin mercaptide stabilizer, the improvement reducing loss of the stabilizer from the blend upon prolonged exposure to light and heat which comprises incorporating in the blend an effective stabilizing amount of at least one compound of the formula:

$$(n\text{-}C_{12}H_{25})_2Sn[S(CH_2)_nCOOR]_2 \text{ or}$$

$$(n\text{-}C_{12}H_{25})Sn[S(CH_2)_nCOOR^1]_3$$

wherein n is 1 or 2, and each of R and $R^1$, independently of the other, is alkyl of 6 to 18 carbon atoms.

8. The process according to claim 7 wherein the copolymer is selected from the group consisting of acrylonitrile/butadiene/styrene, acrylonitrile/butadiene, acrylonitrile/acrylate, styrene/acrylonitrile, ethylene/vinyl acetate and modified ethylene/vinyl acetate.

9. The process according to claim 7 wherein the amount of stabilizer is from 0.5 to 5% by weight.

10. The process according to claim 7 wherein n has a value of 1.

11. The process according to claim 7 wherein R and $R^1$ contain from 8 to 14 carbon atoms.

12. The process according to claim 7 wherein R and $R^1$ are ethylhexyl.

* * * * *